July 8, 1924.  
A. A. HOLLE  
1,500,320  
STEERING GEAR FOR MOTOR ROAD VEHICLES  
Filed Nov. 30, 1923   2 Sheets-Sheet 1

INVENTOR  
Alexander Albert Holle  
per Robert Phillips  
Attorney

July 8, 1924.

A. A. HOLLE 1,500,320

STEERING GEAR FOR MOTOR ROAD VEHICLES

Filed Nov. 30, 1923  2 Sheets-Sheet 2

INVENTOR
Alexander Albert Holle
per Robert O. Phillips
Attorney

Patented July 8, 1924.

1,500,320

UNITED STATES PATENT OFFICE.

ALEXANDER ALBERT HOLLE, OF PADDINGTON, LONDON, ENGLAND.

STEERING GEAR FOR MOTOR ROAD VEHICLES.

Application filed November 30, 1923. Serial No. 677,739.

*To all whom it may concern:*

Be it known that I, ALEXANDER ALBERT HOLLE, a subject of the Queen of the Netherlands, residing at 60 Oxford Terrace, Paddington, in the administrative county of London, England, have invented certain new and useful Improvements in Steering Gears for Motor Road Vehicles, of which the following is a specification.

This invention relates to steering gear for motor road vehicles all of the four wheels of which are employed for steering purposes, of the type in which said road wheels can be controlled either so that the front pair and the rear pair turn in opposite directions, or that said pairs of wheels turn in the same direction, or that while the front wheels are turned the rear wheels remain locked in their central or straight running positions, and it has for its object a construction of gear which is of simple and robust nature and is easily and readily applicable to the hand control mechanism usually employed in the Ackermann system of steering now universally employed on motor road vehicles.

According to the present invention the horizontally and transversely disposed shaft of the hand controlling mechanism is provided with two drop arms one adapted to be connected to the link-work of one pair of steering road wheels and the other adapted to be connected to the link-work of the rear steering road wheels. One of these arms is a permanent fixture on the shaft and the other is so constructed and arranged that its end by which it is coupled to the link-work of the other pair of steering road wheels, can be shifted to assume three different positions, viz; (1) to coincide with the axis of the joint by which the operative end of the fixed arm is connected to the coupling rod of the link-work of the steering wheels which it controls (2) to lie diametrically opposite to and equidistant from the axis of the joint by which the operative end of the fixed arm is connected to the coupling rod of the link-work of the steering wheels which it controls and (3) to coincide or approximately coincide with the axis of the shaft carrying the fixed arm. Any suitable mechanism is employed whereby the necessary movement to effect the changes of position can be brought about from the driver's seat.

In the accompanying drawing which shows a convenient embodiment of this invention:—

Throughout the views similar parts are marked with like numerals of reference.

Figure 1:
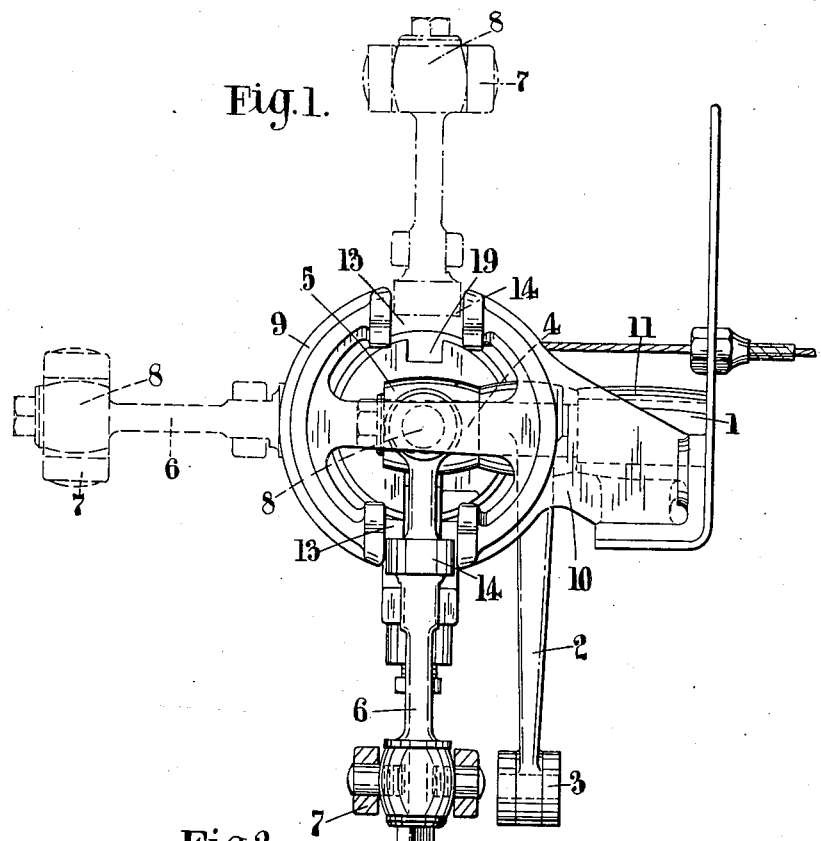
Figs. 1 and 2 are views in end and side elevation respectively.
Figure 2:
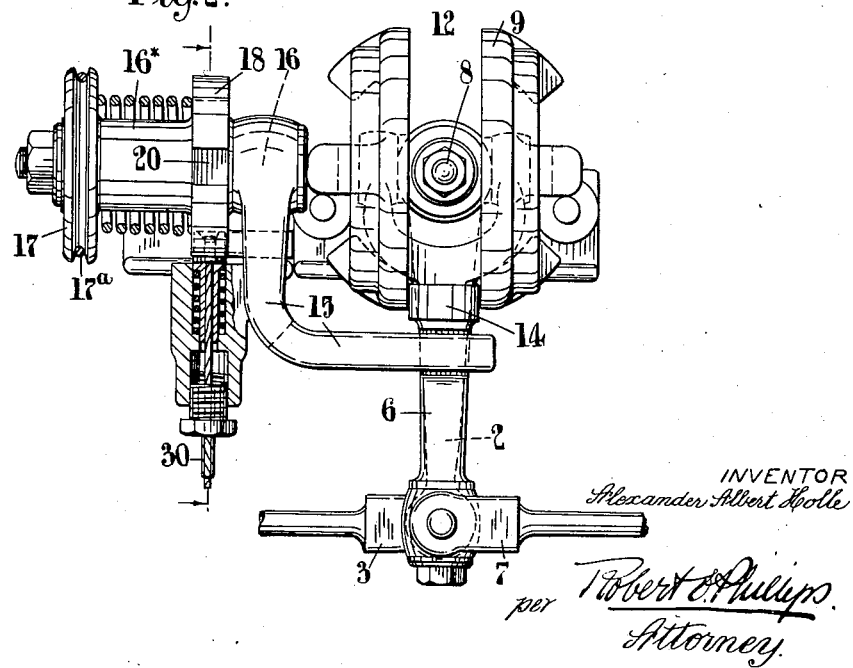
Figure 4:
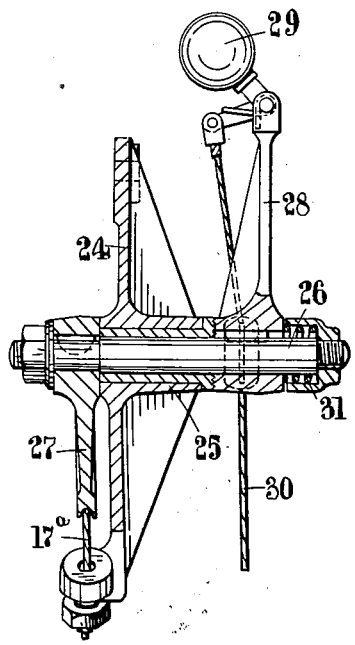
Figs. 3 and 4 are views in front and side elevation—the latter partly in section,— showing a convenient means for controlling the position of the shifting arm, and, Fig. 5 is a view partly in section of a locking device.
Figure 3:
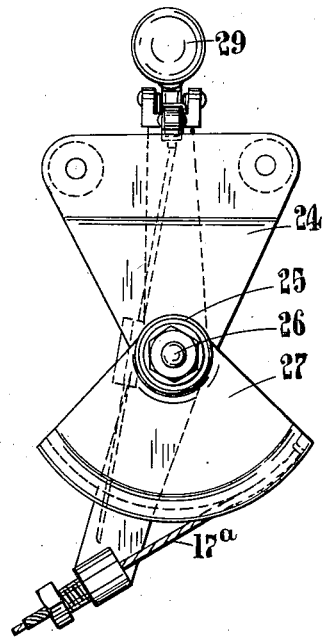
Figure 5:
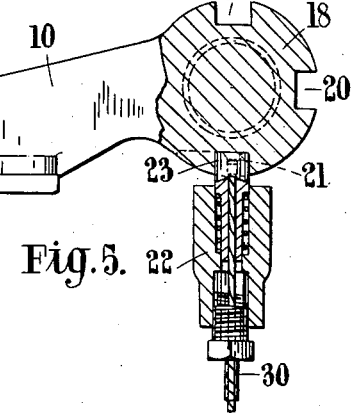

To the shaft 1 of the hand-operated steering mechanism is fixed an arm 2 to which is connected the rod 3 for coupling said arm to the link-work of one of the pairs of road wheels of the vehicle. This shaft 1 is provided with an extension 4 on which is fixed a boss 5 on to which is pivoted an arm 6 to which is connected the rod 7 for coupling said arm to the link-work of the other pair of road wheels. The axis of the pivot of the arm 6 is so located that said arm can be rotated through an arc the plane of which lies at right angles to the plane in which the arm 2 rocks so that said arm 6 can be brought into either of three positions, the one so that it lies parallel with the arm 2 as shown in full lines in Fig. 1, another so that it lies diametrically opposed to the arm 2 as shown in dot and dash lines in Fig. 1, and the other so that it lies at right angles to the arm 2 in alignment with the axis of the shaft on which the arm 2 is mounted, as shown in dotted lines in Fig. 1. If the arm 6 is fixed in the position shown in dot and dash lines the four road wheels will be moved for steering purposes, in the usual manner, viz: the two rear wheels in the opposite direction to the two front wheels. If the arm 6 is fixed in the position shown in full lines the two pairs of road wheels will be turned in the same direction which will cause the vehicle to move sideways at the same time that it moves either forward or backward, and if the arm 6 is fixed in the horizontal position shown in dotted lines the rear road wheels will have no steering motion imparted to them and the vehicle will be steered by the front wheels only. As the arm 6 when fixed in the position shown in dotted lines will have an axial rotary motion imparted to it when the arm 2 is moved for steering purposes, the rod 7 is connected to the arm 6 by means of a universal joint 8.

The arm 6 moves in a guide 9 which is carried by a bracket 10 formed on or fixed to the bearing 11 of the gear box of the hand steering mechanism. This guide has circumferential slots 12 and two diametrically opposed transverse slots 13 and 13 with which a circular block 14 on the arm engages, the slot 12 being for the purpose of allowing the position of the arm to be shifted and the latter for the purpose of allowing the arm to swing for steering purposes, the circular form of the block 14 allowing the arm 6 to rotate axially when it is in the position shown in dotted lines.

The arm 6 can be swung into and retained in the desired position by means of any suitable mechanism which can be conveniently operated from the driver's seat. A convenient one is that shown in the accompanying drawing which consists of a cranked arm 15 mounted on a shaft 16 the axis of which is in alignment with the axis of the universal joint by which the arm 6 is mounted on the extension shaft 4 said shaft 16 being mounted in a suitable bearing 16$^x$ carried by the bracket 10. The free limb of the cranked arm 15 is bifurcated to embrace the arm 6 and allow it the necessary swinging movement for steering purposes. On the shaft 16 is mounted a grooved pulley 17 to which one end of an operating wire 17$^a$ is secured and between said pulley and a disc 18 carried by the bracket 10 is a rat-trap spring which operates to return said pulley after it has been rotated by the wire 17$^a$. In the periphery of the disc 18 are three slots 19, 20 and 21 which correspond to the three positions it is desired the arm 6 should occupy. On the cranked arm 15 in a boss 22 in which is mounted a sliding spring-controlled detent 23 which is adapted to engage one or other of the slots in the disc 18 and thus fix said cranked arm in the desired position. In a position convenient for the driver is a bracket 24 which carries a bearing 25 in which is mounted a shaft 26. On one end of this shaft is fixed a quadrant 27 to which is secured the other end of the wire 17$^a$ and on the other end of the shaft 26 is mounted a lever 28 for rotating the quadrant 27 said arm being provided with a trip device 29 for operating the detent 23 through a wire 30. Both of the wires 17$^a$ and 30 may either be provided with suitable guides or may be of the well-known "Bowden" type. To retain the lever 28 in any position into which it may be moved the adjacent faces of the bearing 25 and of the boss of the lever 28 are serrated and the lever 28 is so mounted on the shaft 26 that it is free to slide longitudinally thereon, a spring 31 being employed to keep the boss of the lever in engagement with the bearing 25.

What I claim is:

1. In a steering gear for motor road vehicles, the combination with the shaft operated by the hand-controlled mechanism of a drop arm fixed on said shaft and adapted to be connected to the link-work between one pair of road wheels by a suitable connecting rod; a drop arm adapted to be connected to the link-work between the other pair of road wheels by means of a suitable connecting rod, said arm being pivoted to said shaft so that it is free to turn through an arc the plane of which lies at right angles to the plane in which it rocks to impart the steering movement; and means for moving the pivoted arm through the desired arc and for locking same in the desired position.

2. In a steering gear for motor road vehicles, the combination with the shaft operated by the hand-controlled mechanism of a drop arm fixed on said shaft and adapted to be connected to the link-work between one pair of road wheels by a suitable connecting rod; a drop arm adapted to be connected to the link-work between the other pair of road wheels by means of a suitable connecting rod, said arm being pivoted to said shaft so that it is free to turn through an arc the plane of which lies at right angles to the plane in which it rocks to impart the steering movement; means for guiding said arm in its movement through said arc, means for guiding said arm throughout the movement imparted to it by said shaft; and means for moving the pivoted arm through the desired arc and for locking same in the desired position.

3. In a steering gear for motor road vehicles, the combination with the shaft operated by the hand-controlled mechanism of a drop arm fixed on said shaft and adapted to be connected to the link-work between one pair of road wheels by a suitable connecting rod; a drop arm adapted to be connected to the link-work between the other pair of road wheels by means of a suitable connecting rod, said arm being so mounted on said shaft so that it is free to turn through an arc of 180° in the axial plane of said shaft and not be influenced by the rotary movement of said shaft, means for moving the pivoted arm through said arc, means for locking said arm in three positions in said arc, means for guiding said arm in its movement through said arc, and means for guiding said arm throughout the movements imparted to it by said shaft.

4. A steering gear for motor road vehicles comprising a shaft operated by the hand-controlled mechanism, an arm fixed on said shaft and adapted to operate one pair of road wheels, an arm adapted to operate the other pair of road wheels said arm being so mounted on said shaft so that it is free to turn through an arc of 180° in a plane at right angles to the plane in which it rocks to impart the steering movement, and so that it does not partake of the rotary movement of said shaft, means for moving the pivoted arm through said arc, means for locking said arm in either of the following three positions (1) in line with the arm fixed on the shaft, (2) in a diametrically opposite position to the arm fixed on the shaft and (3) in alignment with the axis of said shaft, means for locking said arm in each of said positions, means for guiding said arm in its movement through said arc, and means for guiding said pivoted arm throughout the movement imparted to it by said shaft to operate the pair of steering wheels with which it is connected.

ALEXANDER ALBERT HOLLE.